United States Patent [19]

Crooker

[11] 4,136,562
[45] Jan. 30, 1979

[54] AUDIBLE SPEED INDICATOR FOR HANG GLIDER

[76] Inventor: Stephen M. Crooker, 28 Mechanic St., Lebanon, N.H. 03766

[21] Appl. No.: 875,067

[22] Filed: Feb. 3, 1978

[51] Int. Cl.² ............................................. G01C 21/10
[52] U.S. Cl. .................................................... 73/187
[58] Field of Search ........................... 73/187, 189, 230

[56] References Cited

U.S. PATENT DOCUMENTS

| 914,959 | 3/1909 | Lallie | 73/189 |
|---|---|---|---|
| 1,957,681 | 5/1934 | Thompson | 73/187 |
| 3,756,077 | 9/1973 | Milovancevic | 73/187 |

*Primary Examiner*—Donald O. Woodiel

*Attorney, Agent, or Firm*—Sughrue, Rothwell, Mion, Zinn and Macpeak

[57] ABSTRACT

An audible speed indicator for hang gliders or the like comprises an air driven impeller 16 whose initial point of rotation start-up may be adjusted to correspond to the stall speed by rotating cowling section 14 relative to housing 13 to thereby vary the opening area of side exhaust windows 15. The impeller drives a slotted disc 18 which passes light pulses from a source 19 to a photocell 20, whose output triggers an oscillator 23. The oscillator output energizes a speaker 24, whose audible pulse frequency is thus proportional to air speed. The audio volume may also be reduced or blanked within a predetermined air speed range by a frequency detector 27, whose upper and lower triggering frequencies are adjustable.

9 Claims, 3 Drawing Figures

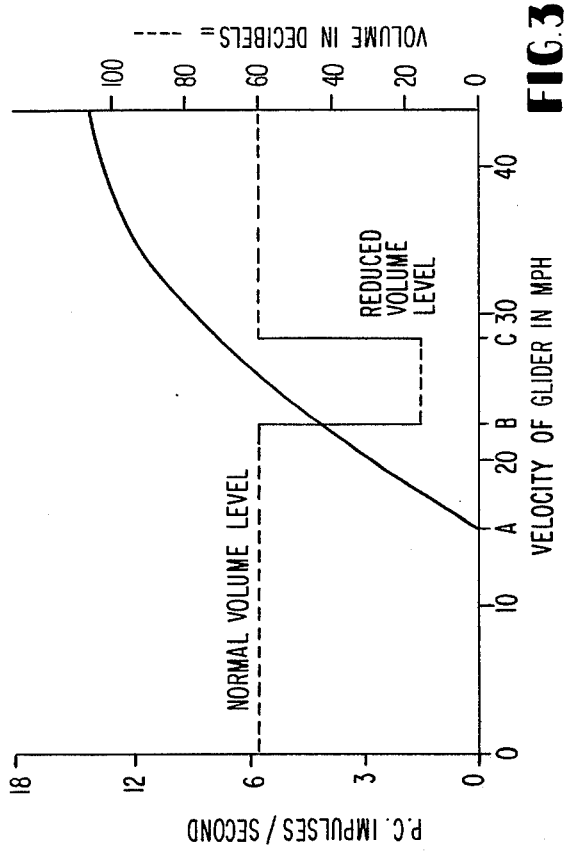
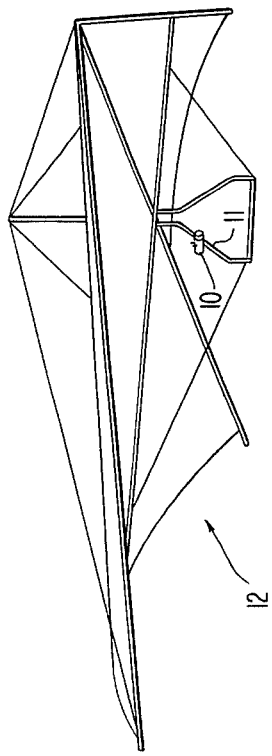
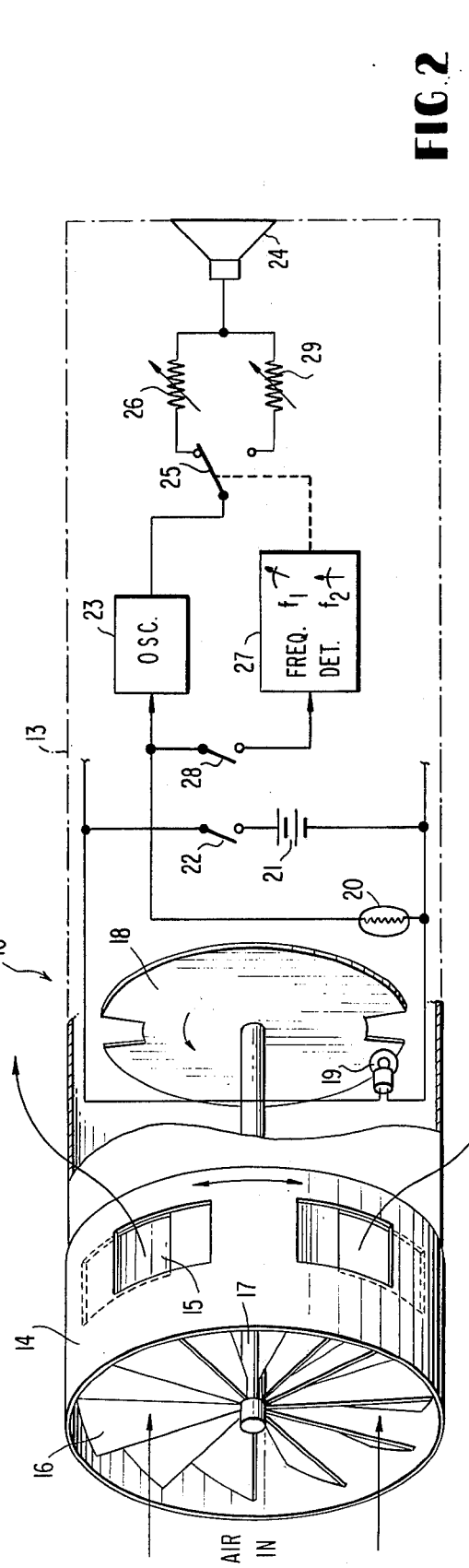

AUDIBLE SPEED INDICATOR FOR HANG GLIDER

BACKGROUND OF THE INVENTION

This invention relates to a speed indicator for hang gliders or the like having an audio output whose frequency varies in proportion to air speed.

U.S. Pat. No. 2,386,992 to Trott discloses an audible stall speed indicator for aircraft wherein Pitot tubes fitted with venturi sections are coupled to variable capacitor pressure sensors of the diaphragm type. The capacitors control oscillator frequencies whose outputs beat against an audio oscillator output to produce a composite output signal that peaks in both frequency and amplitude at the stall speed. The relative complexity and excessive hardware requirements of the Trott device render it unacceptable for use with small, inexpensive, lightweight airborne vehicles, such as hang gliders.

U.S. Pat. No. 914,959 to Lallie discloses a liquid flow meter having an impeller driving an electrical make-and-break switch, or circuit interrupter, series connected in an audio pulsing circuit. The device is intended to enable flow measurement by having a listener/operator simply count the number of generated pulses. The Lallie device would not appear to be operable, even with major modifications, in a relatively slow speed airborne vehicle such as a hang glider.

Other prior art references developed during the course of a patentability search on this invention, but whose teachings do not appear sufficiently pertinent or germane to warrant detailed discussion, are as follows:

U.S. Pat. No. 1,267,633 — F. H. Clift
U.S. Pat. No. 2,311,395 — A. A. Johnson
U.S. Pat. No. 2,706,406 — R. P. Vincent et al.
U.S. Pat. No. 3,610,039 — J. Althouse et al.
U.S. Pat. No. 3,739,367 — G. H. Fathauer
U.S. Pat. No. 3,859,629 — K. Komiyama et al.
U.S. Pat. No. 3,919,688 — G. Schick

SUMMARY OF THE INVENTION

Briefly, and according to the present invention, an audible speed indicator for hang gliders or the like comprises an air driven impeller whose initial point of rotational start-up may be adjusted to correspond to the stall speed by rotating a cowling section relative to an instrument housing to thereby vary the opening area of side exhaust vents. The impeller drives a slotted disc/photocell pulse generator, whose output triggers an oscillator. The oscillator output energizes a speaker, whose audible pulse frequency is thus proportional to air speed. The audio volume may also be reduced or blanked within a predetermined air speed range by a frequency detector, whose upper and lower triggering frequencies are adjustable. Since no visual indicator is involved, the pilot's attention is not diverted from his normal flight control manipulations.

BRIEF DESCRIPTION OF THE DRAWINGS

In the drawings:
FIG. 1 shows a perspective view of the audible speed indicator of the invention mounted on a hang glider,
FIG. 2 shows a schematic diagram of the primary mechanical and electrical components of the speed indicator, and
FIG. 3 shows a graph of the audio operating characteristics of the speed indicator.

DETAILED DESCRIPTION OF THE PREFERRED EMBODIMENT

Referring now to the drawings, FIG. 1 illustrates an audible speed indicator unit 10 according to the invention clamp mounted or the like on a control bar 11 of a hang glider 12.

The more detailed schematic diagram of FIG. 2 shows the unit 10 as comprising a housing 13 having an axially rotatable cowling section 14 at its forward end. The rotation of the cowling section serves to adjust the opening area of side windows or air exhaust vents 15, which controls the relative incoming air velocity at which a bladed impeller 16 mounted on a shaft 17 will begin to rotate. This initial rotation point is normally set to correspond to the stall speed of the glider, which is approximately 15 miles per hour for most gliders, and the appropriate rotational setting or adjustment of the cowling section 14 may be implemented by calibration indicia between the cowling section and the stationary housing 13.

A radially slotted disc 18 is mounted on the inner end of the shaft 17 and is disposed between a light source 19 and a photocell 20. The light source is energized by a battery 21 through a master on-off switch 22. With the switch 22 closed, each time light from the source 19 strikes the photocell 20 through a slot in the disc 18 a triggering pulse is generated and supplied to an oscillator 23, whose output in turn energizes an audio speaker 24 through a transfer switch 25 and a variable volume control resistor 26.

Thus, with the master on-off switch closed and the transfer switch 25 in the upper position shown in FIG. 2, the indicator will begin to emit audible pulses when the incoming air velocity reaches the stall speed of the glider, and the frequency of such pulses will increase in a substantially linear manner as the air speed of the glider increases. Conversely, a decrease in the frequency of the audible pulses when the glider is airborne serves to alert the operator to the fact that his air speed is decreasing, and possibly approaching the stall speed. Since no visual indicators are involved the attention of the operator is not diverted from his normal flight control functions.

In an alternate mode of operation the indicator may be used to signal the operator when he is gliding within a predetermined speed range, whose lower limit may correspond to a maximum lift/drag ratio and whose upper limit may correspond to a maximum penetration speed. This alternate mode is implemented by a frequency detector 27 supplied with the photocell output through a mode switch 28. The output of the frequency detector serves to transfer the switch 25 to its lower position in FIG. 2 at a first adjustable photocell output frequency $f_1$ corresponding to the maximum lift/drag ratio, for example, and to release or return switch 25 to its upper position as shown at a second adjustable photocell output frequency $f_2$, which may correspond to the maximum penetration speed. When switch 25 is in its lower position the oscillator output is coupled to the speaker 24 through an adjustable, relatively high value control resistor 29, which sharply reduces the audio output volume. As an alternative, the resistor 29 can be eliminated and the switch 25 simply opened in the speed range corresponding to the photocell output frequency being greater than $f_1$ but less than $f_2$. This would disable the audio output in the predetermined speed range, and may be preferable for some operators who consider the constant audio pulses as a source of annoyance or distraction.

When the switch 25 is transferred to its upper position the operator can easily tell if his speed is below the $f_1$ setting or above the $f_2$ setting since the audio frequency differs sharply between $f_1$ and $f_2$.

As will be readily apparent, the switches 22 and 28 and the adjustments for resistors 26 and 29 and frequencies $f_1$ and $f_2$ are all accessible from the exterior of the housing 13. Similarly, the power supply and return connections for the oscillator 23 and the frequency detector 27, and the return connections for the photocell 20 and the speaker 24 have been omitted for the sake of simplicity.

FIG. 3 shows a graph of the audio operating characteristics of the speed indicator, with the glider velocity being plotted on the abscissa in miles per hour, the photocell/audio output frequency being plotted on the left-hand ordinate, and the audio volume being plotted on the right-hand ordinate. Point A on the abscissa could correspond to stall speed, for example, point B could correspond to the maximum lift/drag ratio, and point C could correspond to the maximum penetration speed.

The invention is not limited to use only with hang gliders, but is equally applicable to and useful in connection with any water, ground or airbourne vehicle for which an audible speed indication is desired without requiring the operator's attention. The invention would also be useful in a mock-up or trainer environment to facilitate student training of hang glider operators or the like. Further, the pulse generator is not limited to a slotted disc-photocell arrangement, but could equally be implemented, for example, by a rotating magnet and reed switch combination.

What is claimed is:

1. An audible speed indicator for a movable vehicle, such as a hang glider or the like, comprising:
    (a) a housing adapted to be mounted to the vehicle,
    (b) an impeller rotatably mounted in the housing,
    (c) means for varying the passage of air through the impeller to thereby adjust the air speed at which the impeller will commence rotation,
    (d) electrical pulse generator means driven by the impeller, and
    (e) audio generator means energized by the output of the pulse generator means, whereby the frequency of the audio generator means output is proportional to air speed.

2. A speed indicator as defined in claim 1, wherein the means for varying the passage of air through the impeller comprises air vent windows in the housing and a rotationally adjustable cowling section surrounding said windows and having mating openings therein, whereby the rotational adjustment of the cowling section varies the opening area of said windows.

3. A speed indicator as defined in claim 1, wherein the electrical pulse generator means comprises a light source, a photocell spaced therefrom, and a slotted disc driven by the impeller and disposed between the light source and the photocell.

4. A speed indicator as defined in claim 2, wherein the electrical pulse generator means comprises a light source, a photocell spaced therefrom, and a slotted disc driven by the impeller and disposed between the light source and the photocell.

5. A speed indicator as defined in claim 1, wherein the audio generator means comprises an oscillator triggered by the pulse generator means output, and an electroacoustic transducer driven by the oscillator output.

6. A speed indicator as defined in claim 4, wherein the audio generator means comprises an oscillator triggered by the pulse generatormeans output, and an electroacoustic transducer driven by the oscillator output.

7. A speed indicator as defined in claim 1, further comprising frequency detector means responsive to the pulse generator means output for reducing the audio generator means output volume when the pulse generator means output is within a predetermined, adjustable frequency range.

8. A speed indicator as defined in claim 4, further comprising frequency detector means responsive to the pulse generator means output for reducing the audio generator means output volume when the pulse generator means output is within a predetermined, adjustable frequency range.

9. A speed indicator as defined in claim 6, further comprising frequency detector means responsive to the pulse generator means output for reducing the audio generator means output volume when the pulse generator means output is within a predetermined, adjustable frequency range.

* * * * *